United States Patent [19]

Delapierre

[11] Patent Number: 4,776,924

[45] Date of Patent: Oct. 11, 1988

[54] PROCESS FOR THE PRODUCTION OF A PIEZORESISTIVE GAUGE AND TO AN ACCELEROMETER INCORPORATING SUCH A GAUGE

[75] Inventor: Gilles Delapierre, Seyssins, France

[73] Assignee: Commissariat a l'Energie Atomique, Seyssins, France

[21] Appl. No.: 95,677

[22] Filed: Sep. 14, 1987

[30] Foreign Application Priority Data

Oct. 2, 1986 [FR] France .................... 86 13756

[51] Int. Cl.$^4$ .................. H01L 21/306; B44C 1/22; C23F 1/02; C03C 15/00
[52] U.S. Cl. .................... 156/647; 29/25.35; 29/620; 29/621.1; 73/514; 73/517 R; 73/727; 73/DIG. 4; 156/651; 156/653; 156/656; 156/657; 156/659.1; 156/661.1; 156/662; 310/311; 338/2
[58] Field of Search ............... 156/647, 651, 653, 656, 156/657, 659.1, 661.1, 662; 29/25.35, 610 SG, 620; 73/517 R, 517 AV, 517 A, 518, 723–727, DIG. 4; 338/2; 310/311, 321, 324, 338, 367

[56] References Cited

U.S. PATENT DOCUMENTS 3,417,322 12/1968 Fenner .................. 323/75
4,488,445 12/1984 Aske .................. 73/517 R
4,581,928 4/1986 Johnson .................. 73/204
4,614,119 9/1986 Zavracky et al. .................. 73/704
4,670,092 6/1987 Motamedi .................. 156/647 X

FOREIGN PATENT DOCUMENTS 2558263 7/1985 France .
2614775 10/1977 Fed. Rep. of Germany .

*Primary Examiner*—William A. Powell
*Attorney, Agent, or Firm*—Oblon, Fisher, Spivak, McClelland & Maier

[57] ABSTRACT

This process consists of etching a substrate perpendicular to its surface in order to form a recess communicating therewith and in which can move laterally the flexible beam, the communication zone representing the image of the gauge to be produced, placing on the substrate surface a mask provided with an opening facing said recess and extending partly over the beam, passing through the opening a particle beam able to form a deposit of piezoresistive material constituting the gauge and electric contacts, said beam being oriented obliquely with respect to the substrate surface, eliminating the mask and producing electrical conductors on the upper and lower faces of the beam in order to supply current to the gauge.

9 Claims, 5 Drawing Sheets

PROCESS FOR THE PRODUCTION OF A PIEZORESISTIVE GAUGE AND TO AN ACCELEROMETER INCORPORATING SUCH A GAUGE

BACKGROUND OF THE INVENTION

The present invention relates to a process for the production of a piezoresistive strain gauge on one lateral face of a flexible beam more particularly belonging to a directional accelerometer, as well as to a process for producing a directional accelerometer equipped with a piezoresistive gauge. These processes use microelectronics technology.

In general terms, an accelerometer essentially comprises a moving mass m and means making it possible to measure the force $F=m.A$ due to the acceleration A of a moving body. A directional accelerometer produced on the basis of microelectronics technology is described in FR-A-2 558 263 in the name of the present Applicant.

FIG. 1 shows in perspective part of the accelerometer described in the aforementioned document. This accelerometer comprises a parallelepipedic substrate 2 having a recess 4 completely traversing the substrate. In said recess are located two parallelepipedic flexible beams 6, 8, whose thickness is much greater than the width (typically 30 times greater). These beams are oriented in a direction Y parallel to the surface of the substrate. These beams have a fixed end integral with substrate 2 and a free end supporting a parallelepipedic block 10.

The displacement of block 10 in direction x is measured with the aid of capacitive detectors, defined by conductive deposits on the lateral faces 12, 14 of block 10 and on the walls of recess 2 facing said faces 12, 14.

This solution has the advantage of being easily brought about according to microelectronics technology. However, these capacitive detectors suffer from a certain number of disadvantages. In particular, they are very sensitive to parasitic capacitances, have a high internal impedance and a non-linear response. However, they have an important influence on the electrostatic forces produced in the accelerometer.

Beams 6 and 8, as well as block 10 are monoblocks and defined by anisotropic etching of substrate 2. They constitute the seismic or moving mass of the accelerometer. Beams 6 and 8 can deform, leading to a displacement of block 10, in a direction x parallel to the surface of the substrate and perpendicular to direction y, said direction x corresponding to the direction of the component of the acceleration to be measured.

The use of piezoresistive strain gauges deposited on the beam of said accelerometer would make it possible to solve the disadvantages associated with capacitive sensors.

It is pointed out that a piezoresistive strain gauge is a conductive strip, whose resistance varies with the deformations of the beam on which it is located. This solution was envisaged in the aforementioned document. The gauges associated in pairs and designated 15 and 17 in FIG. 1 are resistors disposed on the upper face of the beams, which is the only face accessible by conventional micrography processes.

Unfortunately, in this type of accelerometer, the aim is to have a much greater flexibility in direction x (parallel to the surface of the substrate in which the accelerometer is formed and perpendicular to the longitudinal direction of beam y) than in direction y. However, these beams typically have a width of 3 to 10 micrometers for a thickness of a few hundred micrometers. In view of the fact that very little space is available for positioning strain gauges on the upper surface of the beams, serious technical problems are caused by the construction of said gauges.

This is made worse by the fact that strain gauges cannot be positioned along the median longitudinal axis y of beams because on the neutral fibre 16 of the beams, the deformation in direction z perpendicular to the substrate surface is zero. Furthermore, these strain gauges can also not be positioned over the entire length of the beam because, on average, the deformation is zero.

This problem can be solved by utilizing strain gauges of the type shown in FIG. 1 located at both ends of the beams. However, on adding the current supply conductors for these gauges, serious technological problems occur due to the very small dimensions of the elements of the accelerometer. Moreover, assuming that such a structure can be produced, there would still be the problem of heat dissipation, in view of the fact that the gauges only occupy a very small surface on the upper face of the beams.

In view of the problems concerning the available space on the upper face of the beams, the inventors have considered depositing strain gauges on the lateral faces of the beams, oriented parallel to direction y and perpendicular to direction x of detection of an acceleration. Unfortunately, the conventional microelectronics processes using etching masks or deposits parallel to the surface of the substrate do not make it possible to accurately define patterns on the faces perpendicular to the substrate (lateral faces of the beams).

SUMMARY OF THE INVENTION

The present invention is directed at a process for the production of a piezoresistive strain gauge located on a lateral face of a flexible beam, especially of an accelerometer, produced according to microelectronics technology.

More specifically, the invention relates to a process for the production of a piezoresistive gauge on a lateral face of a beam formed by etching a substrate perpendicular to its surface and having and end which can move laterally in a first recess defined in the substrate comprising the stages of etching the substrate perpendicular to its surface for forming a second recess communicating with the first, the communication zone representing the image of the gauge to be produced, placing on the substrate surface of a mechanical mask having an opening facing the second recess and partly extended over the upper face of the beam, passing through said opening a particle beam able to form a piezoresistive layer constituting the gauge and electric contacts, said beam being oriented obliquely with respect to the substrate surface, elimination of the mask and producing electrical conductors on the upper and lower faces of the beam with a view to supplying the gauge with electric current.

This production process is easy to perform.

The piezoresistive gauge can be formed by depositing a piezoresistive material by vacuum evaporation or, in the case of a silicon substrate, by implanting ions, e.g. of boron or phosphorus.

When the piezoresistive gauge is evaporated, it is preferably made from polycrystalline germanium doped with several % of gold. Such a material makes it possible to obtain an adequately high transverse gauge coefficient Kt. The transverse coefficient of a gauge is defined in the present case by $(\Delta sy/sy)/(\Delta z/z)$ with $\Delta sy/sy$ representing the conductivity variation along axis y and $\Delta z/z$ the deformation of the beam along axis z.

The current supply conductors can be deposited on the surface of the beam either before etching the substrate, or after depositing the piezoresistive gauge. The electrical conductors can be deposited in advantageous manner by vacuum evaporation.

The invention also relates to a process for producing an accelerometer having a piezoresistive gauge obtained as hereinbefore and wherein the first and second recesses are simultaneously formed by etching the substrate perpendicular to its surface.

Advantageously the first and second recesses are formed by anisotropic chemical etching of the substrate.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

The following description relates to the production of a strain gauge placed on a lateral face of an accelerometer beam produced in accordance with microelectronics technology. However, the invention can obviously also be used for simultaneously producing several piezoresistive gauges. In the case of an accelerometer having two flexible beams, there can be four piezoresistive gauges connected as a Wheatstone bridge. In order to ensure a good stability of the bridge, the gauges can be simultaneously deposited in pairs.

Figure 1:
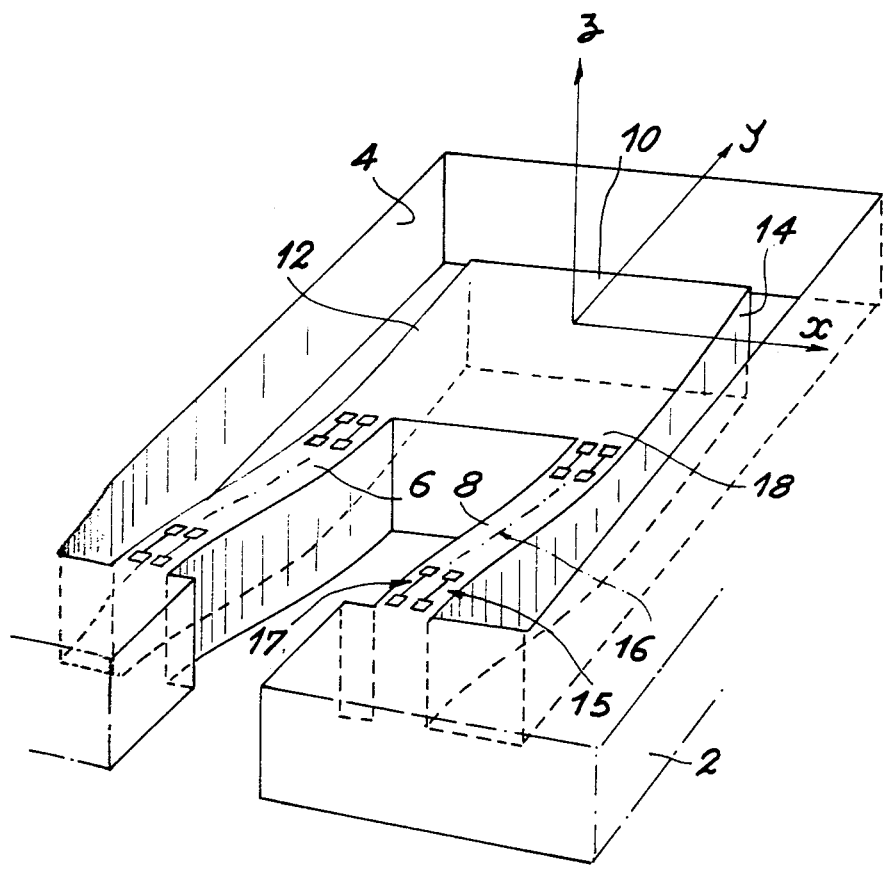
FIG. 1, already described, part of a directional accelerometer produced according to microelectronics technology.
Figure 2:
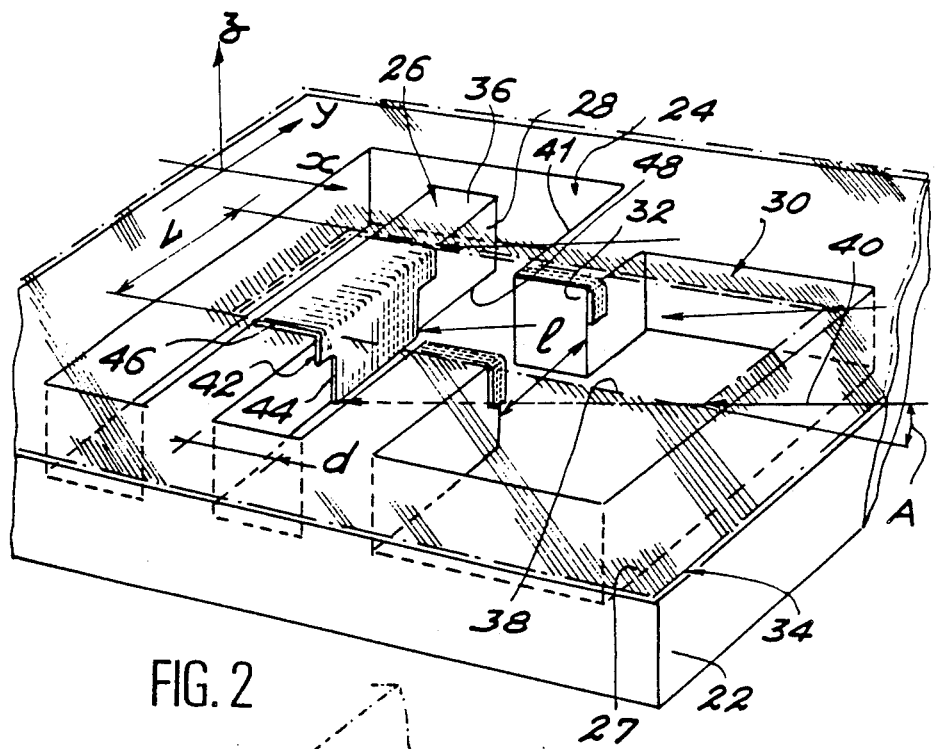
FIG. 2, in perspective, the inventive strain gauge production process.

FIG. 2 is a perspective view of part of an accelerometer which is to be equipped with a piezoresistive strain gauge produced according to the inventive process. This accelerometer comprises a monocrystalline quartz or a silicon substrate 22 having a first recess 24 completely traversing substrate 22, in which is located a flexible beam 26 shaped like a rectangular parallelepiped. Beam 26 has a thickness which is 30 times greater than its width and is oriented in a direction y parallel to the substrate surface. It has a free end able to move in a direction x perpendicular to direction y and parallel to the surface of the substrate under the action of an acceleration directed in said direction x. The other end of the beam is integral with substrate 22.

Beam 26 is obtained by etching substrate 22 perpendicular to its upper surface 27 in an anisotropic manner and by the chemical route using an appropriately shaped mask located on the upper surface 27 of the substrate.

In order to deposit a piezoresistive gauge on a lateral face 28 of beam 26, the substrate is etched perpendicular to its surface 27, in order to form a second recess 30 communicating with the first recess 24. This anisotropically performed etching can be carried out by the wet chemical route.

Etching take place through an appropriately shaped mask made from a good conductive material, such as a gold layer on a chromium layer and located on the upper surface 27 of the substrate. Moreover, said etching is performed over the entire thickness of substrate 22.

The second recess 30 which, in FIG. 2, is shaped like a C, is linked with the first recess 24 by an opening 32 formed in the substrate and representing the image of the gauge to be produced on the lateral face 28 of the beam. In particular, the width l of opening 32 defines the width of the gauge to be produced on the lateral face 28 of beam 26.

Above the upper surface 27 of substrate 22 is then placed a mechanical mask 34 making it possible to define the dimensions of the electric contact zone of the gauge to be produced on the upper face 36 of the beam.

For this purpose, mask 34 has a rectangular opening 38 located above the second recess 30 of opening 32 and partly extended over the first recess 24 and the upper face 36 of beam 26. The width L of opening 38 of the mask preferably exceeds the width l of opening 32 made in the substrate and facing the gauge to be produced.

By using mask 34 and the slot 30–32 made in substrate 22 as the mask, beam 26 is exposed to a particle beam 40 able to form a deposit 42 of a piezoresistive material constituting the gauge and its electric contacts.

A polycrystalline germanium deposit 42 doped with several % of gold (5 to 10%) can be obtained with the aid of a gold and germanium atom beam 40. This material makes it possible to obtain a sufficiently high transverse gauge coefficient Kt. Advantageously, the piezoresistive gauge is deposited by vacuum evaporation at a rate of approximately 1 nm/s.

Preferably, the particle beam 40 is directed onto the lateral face 28 of the beam in accordance with a glancing incidence. In other words the beam 40 forms an angle A with the upper surface 27 of substrate 22. This angle is dependent on the thickness of mask 34, the dimensions of the mask opening 38 and the distance d separating the face 28 of beam 26 and the lateral face of recess 24 facing the same.

It varies between 10° and 30° and is typically 20° for a 0.15 mm thick mask 34, so as to have a piezoresistive deposit 42 having an adequate thickness and having a lateral portion 44 constituting the actual piezoresistive gauge, located on lateral face 28 and extending over the entire thickness of the beam and portions such as 46 respectively covering the upper and lower faces 36, 48 of beam 26 defining the electric contact zones of the gauge. This inclination also makes it possible to avoid an exaggerated covering of beam portion 44.

This is followed by the formation of the electrical conductors for supplying current to the piezoresistive gauge 44, said conductors clearly resting on contacts 46.

Figure 3:
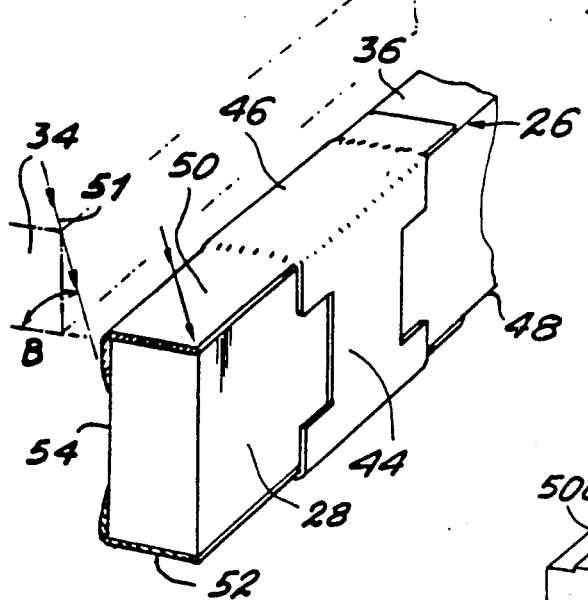
FIG. 3, in perspective, the production of power supply conductors for a piezoresistive gauge produced according to the process of the invention, the conductors being formed after the gauge.

As shown in FIG. 3, these conductors are deposited on the upper and lower faces 36, 48 of beam 26. The current supply conductor, e.g. produced on the upper face 36 of the beam is designated 50 and the current outflow conductor, e.g. placed on the lower face 48 of the beam is designated 52.

These conductors 50 and 52 are deposited by vacuum evaporation using mechanical mask 34 and slot 30-32 of the substrate as a mask during evaporation. The corresponding particle beam 51 forms an angle B with the upper surface of the substrate. This angle is chosen in such a way that the lateral face 54 of the beam, opposite to face 28, is only partly covered with the conductive deposit so as not to short-circuit the gauge, angle B e.g. being between 30° and 60°. Conductors 50 and 52 are in particular made from gold or aluminium.

Figure 4:
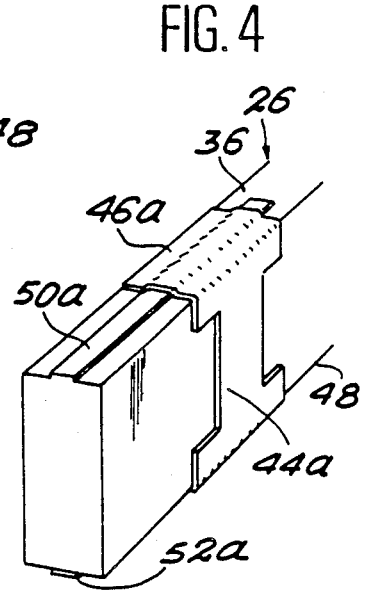
FIG. 4, in perspective, a flexible beam equipped with a piezoresistive gauge and power supply conductors produced in accordance with the inventive process, the conductors being produced before the gauge.

As shown in FIG. 4, it is also possible to produce the electrical conductors 50a and 52a of piezoresistive gauge 44a, respectively disposed on the upper and lower surfaces 36, 48 of the beam 26 before producing the said gauge 44a and its electric contacts 46a, as described with reference to FIG. 2.

Figure 5:
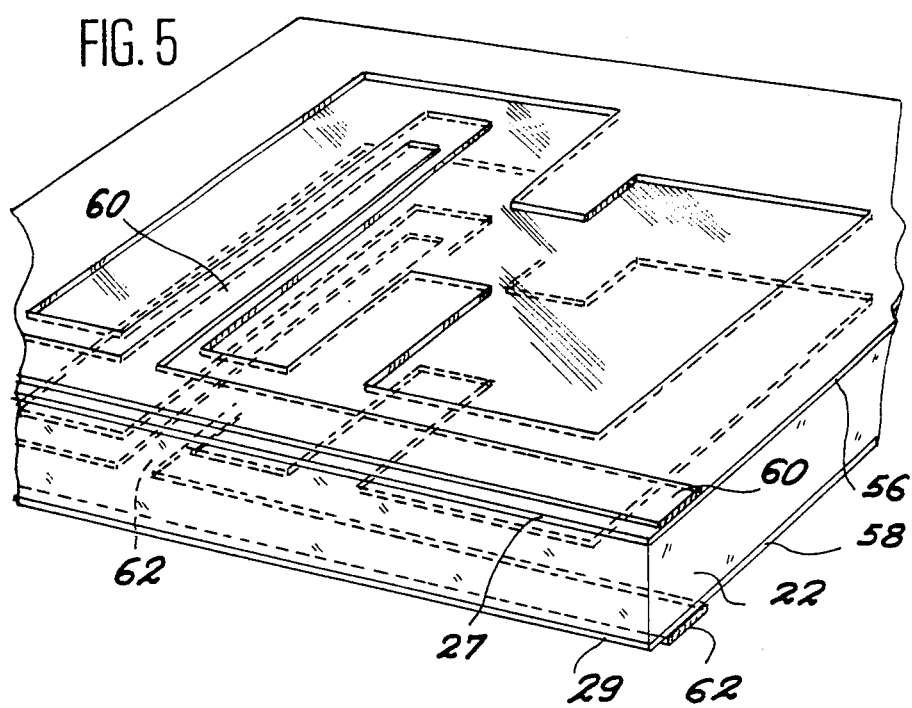
FIGS. 5 to 10, in perspective, the production of an accelerometer with a piezoresistive gauge in which the power supply conductors are produced before the gauge, FIGS. 5 and 6 relating to a quartz substrate and FIGS. 7 to 10 to a silicon substrate.
Figure 6:
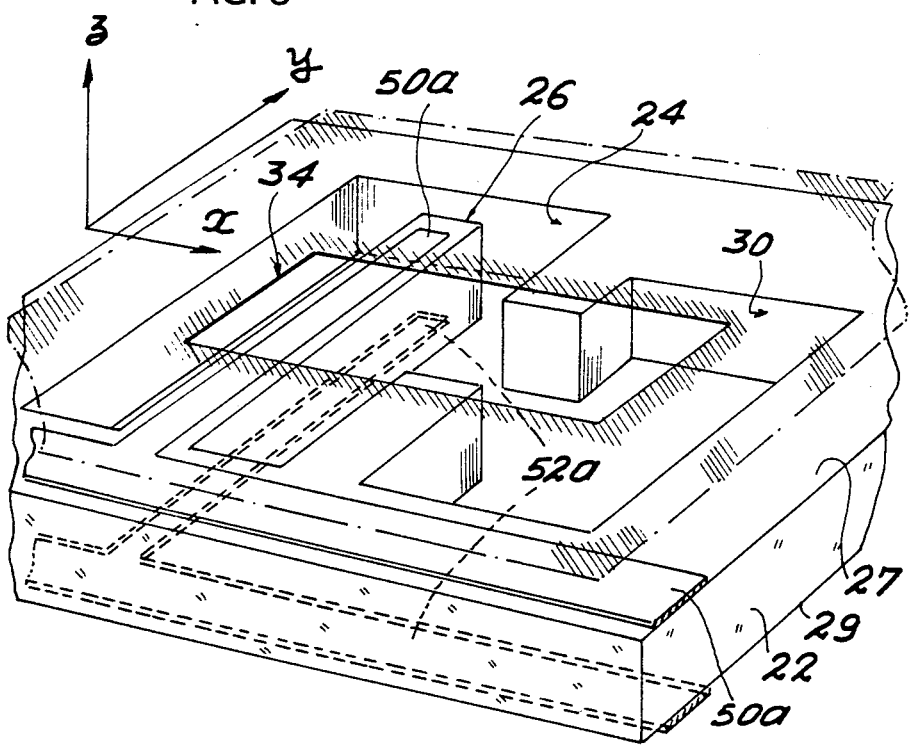
Figure 7:
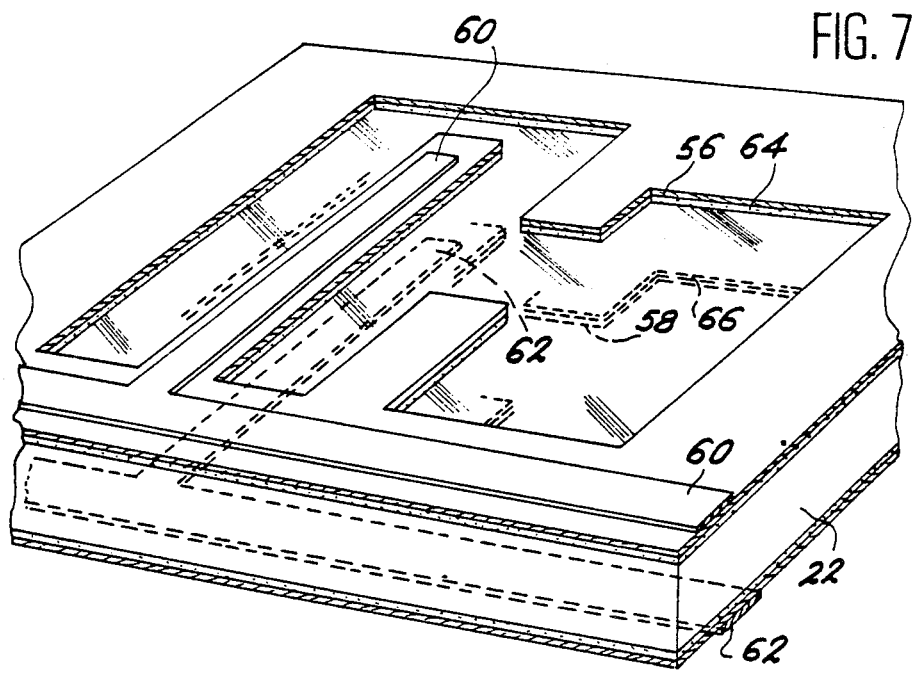

With reference to FIGS. 5 and 6, a description will now be provided of the production of an accelerometer with a piezoresistive strain gauge in which the power supply conductors of the gauge are made before the latter, the substrate being of quartz.

Two conductive layers 56, 58 are formed by vacuum evaporation on respectively the entire upper and lower faces 27, 29 of a quartz substrate 22. These layers 56 and 58 are e.g. formed by a gold layer on a chromium layer.

On layers 56 and 58 are then respectively formed two resin masks, each representing the image of the flexible beam 26 of the accelerometer (FIG. 4), first and second substrate recesses and through said masks there is a first chemical etching of layers 56, 58 (FIG. 5), followed by the elimination of the two etching masks.

One of the thus etched conductive layers 56, 58 will subsequently serve as an etching mask for substrate 22. On the etched layers 56, 58 are then again formed two resin masks 60, 62 representing the image of the power supply conductors, respectively 50a and 52a (FIG. 4) to be produced.

As shown in FIG. 6, this is followed by an anisotropic chemical etching of substrate 22 e.g. using etched layer 56 as the mask. This etching of the substrate is effected perpendicular to its upper surface 27 (direction z), in order to form the first and second recesses 24, 30 respectively and the flexible beam 26 of the accelerometer. Moreover, said etching is performed over the entire thickness of the substrate.

Using resin masks 60, 62, there is then a second etching of layers 56, 58 in order to form the power supply conductors 50a, 52a (FIG. 8) for the piezoresistive gauge.

After the elimination of masks 60, 62 on the upper substrate face 27 is e.g. placed the mechanical mask 34 making it possible to define the lateral dimensions of the gauge. As described relative to FIG. 2, this is followed by the deposition of the piezoresistive gauge and its electric contacts by vacuum evaporation on faces 28, 36 and 48 of beam 26.

A resistance of approximately 6 k.ohm is obtained with a polycrystalline germanium piezoresistive gauge doped with 10% of gold having a width (equal to 1) of 50 micrometers, a length (equal to the substrate thickness and therefore of the beam) of 150 micrometers and a thickness of 0.2 micrometer. Using a Wheatstone bridge of four gauges produced in the manner defined hereinbefore on monocrystalline quartz beams and a beam deformation of $0.5 \cdot 10^3$, an accelerometer is obtained supplying a signal of 7.5 mV per supply volt. This compares with 3 mV per supply volt obtained with conventional accelerometers.

FIGS. 7 to 10 show the production of an accelerometer with piezoresistive strain gauge in which the power supply conductors are still produced prior to the gauge, but in which the substrate is made from silicon.

Compared with the process described relative to FIGS. 5 and 6, between substrate 22 and respectively conductive layers 56, 58 are placed two insulating layers 64, 66 made from $Si_3N_4$ and/or $SiO_2$ and deposited by CVD (chemical vapour phase deposition) or thermal oxidation for $SiO_2$.

After the formation of a resin mask on each of the conductive layers 56, 58 representing the image of the flexible beam and first and second substrate recesses, there is a first etching of conductive layer 56, 58 and then insulating layers 64, 66 (FIG. 7), after which these masks are eliminated.

The insulating layers 64 or 66 etched in this way will subsequently serve as an etching mask for substrate 22. This is followed by the formation of masks 60, 62 representing the image of the power supply conductors 50a, 52a (FIG. 8) to be produced.

Figure 8:
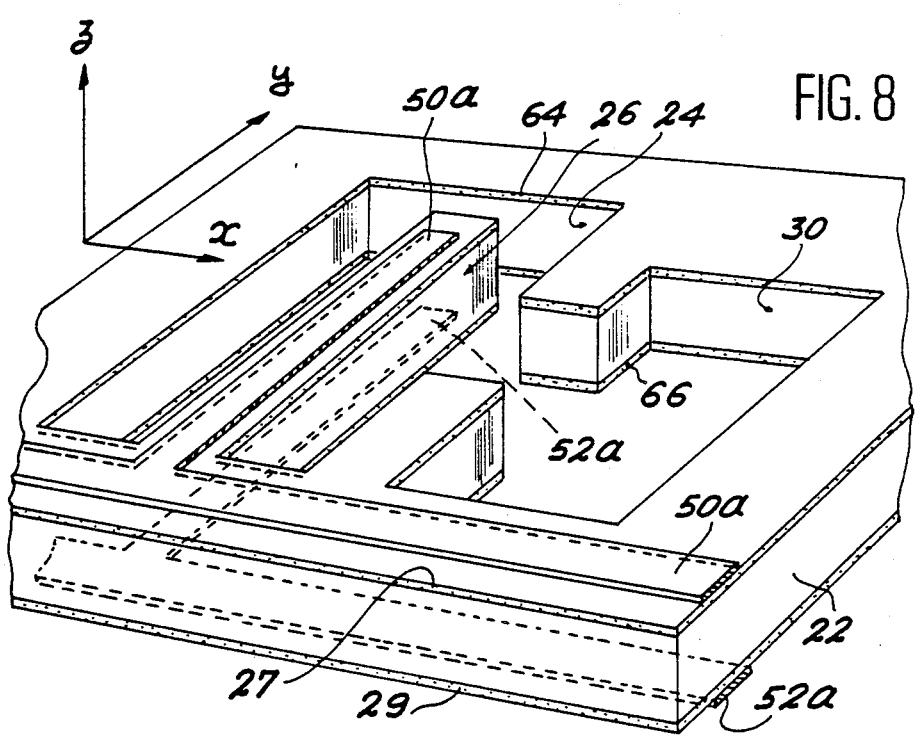

In the manner shown in FIG. 8, this is followed by a second etching of conductive layers 56, 58 to form the supply conductors and then masks 60 and 62 are eliminated.

For example, using the etched insulating layers 64, 66 as the mask, there is an anisotropic chemical etching of substrate 22 over the entire thickness thereof and in direction z perpendicular to the upper substrate surface 27. This makes it possible to form the first and second recesses 24, 30 respectively and the accelerator beam 26.

Figure 9:
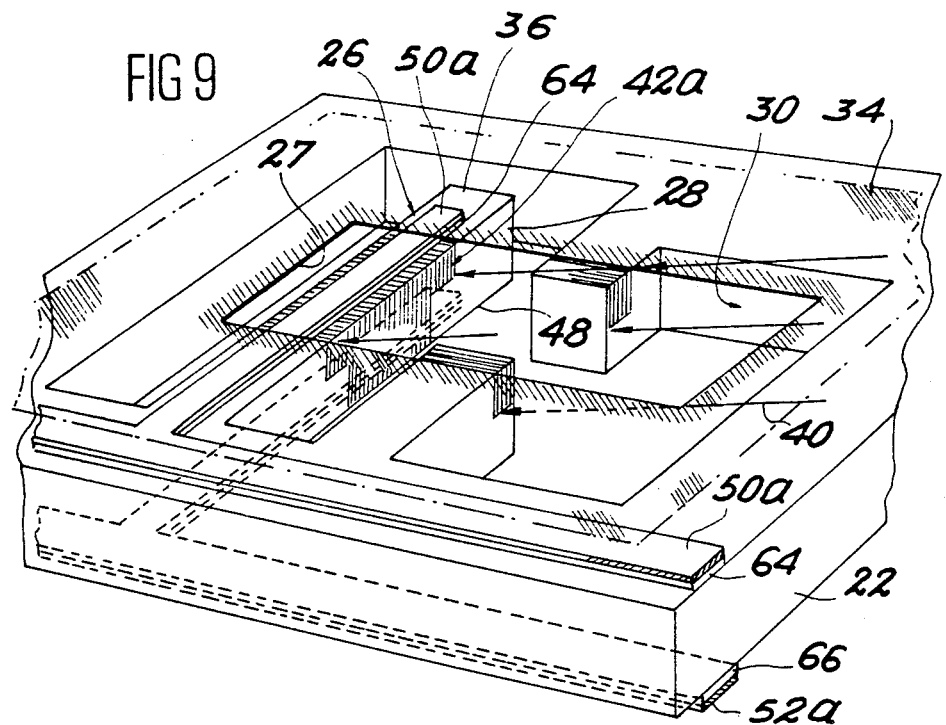

According to FIG. 9, there is then a second chemical etching of insulating layers 64, 66 respectively using conductors 50a and 52a as a mask.

Mechanical mask 34 is then placed on the upper surface 27 of the substrate and boron or phosphorus ions are then implanted through said mask in order to form, in the faces 28, 36 and 48, a piezoresistive layer 42a constituting the gauge and its electric contacts. The inclination of the ion beam 40 is between 10° and 30°, in order to prevent any ion implantation in the lateral face 54 (FIG. 10) of beam 26 opposite to face 28.

A second implantation in accordance with angle B (FIG. 2) can optionally be carried out with a view to obtaining a greater doping of the upper and lower faces of the beam.

Figure 10:
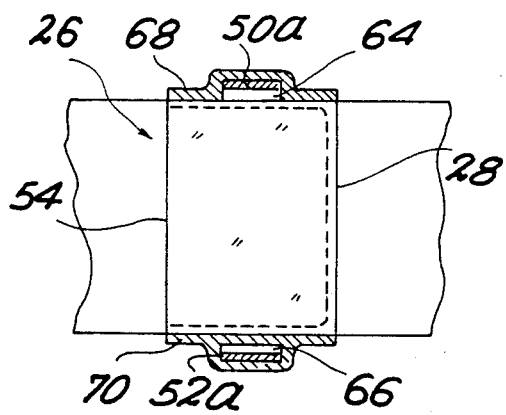

As shown in FIG. 10, this is followed by the formation of two conductive deposits 68, 70, e.g. of aluminium, on and below beam 26 permitting the electrical connection of implanted layer 42a to both the upper conductor 50a and to the lower conductor 52a.

In the case of a silicon substrate with flexible beams 26 obtained by anisotropic chemical etching, the lateral faces and in particular face 28 of the beam must be plains (111) of the silicon, so that the transverse gauge coefficient Kt is in this case close to 30, independently of the direction of the gauges. Under such conditions, the output signal of an accelerometer equipped with four implanted gauges, connected as a Wheatstone bridge, is approximately 15 mV per supply volt, which is once again appropriate.

What is claimed is:

1. A process for the production of a piezoresistive gauge on a lateral face of a beam formed by etching a substrate perpendicular to its surface and having an end which can move laterally in a first recess defined in the substrate comprising the stages of etching the substrate perpendicular to its surface for forming a second recess communicating with the first, the communication zone representing the image of the gauge to be produced, placing on the substrate surface a mechanical mask having an opening facing the second recess and partly extended over the upper face of the beam, passing through said opening a particle beam able to form a piezoresistive layer constituting the gauge and electric contacts, said beam being oriented obliquely with respect to the substrate surface, elimination of the mask and producing electrical conductors on the upper and lower faces of the beam with a view to supplying the gauge with electric current.

2. A production process according to claim 1, wherein the piezoresistive layer is formed from a piezoresistive material deposited by vacuum evaporation.

3. A production process according to claim 2, wherein the piezoresistive material is gold-doped polycrystalline germanium.

4. A production process according to claim 1, wherein the piezoresistive layer is formed by implanting ions in the substrate, the latter being of silicon.

5. A production process according to claim 1, wherein the electrical conductors are produced before the piezoresistive gauge.

6. A production process according to claim 1, wherein the electrical conductors are produced after the piezoresistive gauge by vacuum evaporation.

7. A process for producing an accelerometer with a piezoresistive gauge, having a beam, whereof one end can move laterally in a first recess formed in a substrate, the piezoresistive gauge, produced on a lateral face of the beam being used for measuring the displacement of said beam, wherein the proces comprises etching the substrate perpendicular to its surface in order to simultaneously form the first recess and a second recess communicating with the first recess, the communication zone representing the image of the gauge to be produced, placing on the surface of the substrate a mechanical mask provided with an opening facing the second recess and partly extending over the upper face of the beam, passing through the said opening a particle beam able to form a piezoresistive layer constituting the gauge and electric contacts, said beam being oriented obliquely with respect to the substrate surface, elimination of the mask and production of electrical conductors on upper and lower faces of the beam in order to supply the gauge with electric power.

8. A production process according to claim 7, wherein it comprises the stages of depositing two conductive layers respectively on the upper and lower faces of the substrate, in which will be produced the electrical conductors for supplying power to the gauge, first etching of the two conductive layers in order to form a first etching mask of the substrate representing the image of the first and second recesses, etching the substrate perpendicular to its upper and lower surfaces to form recesses using the first mask, second etching of the conductive layers in order to form the electrical conductors, placing the mechanical mask on the upper surface of the substrate, passing the particle beam through the mechanical mask opening and eliminating the mechanical mask.

9. A production process according to claim 7, wherein the first and second recesses are formed by anisotropic chemical etching of the substrate.

* * * * *